United States Patent [19]

Bloomberg

[11] Patent Number: 5,572,601
[45] Date of Patent: Nov. 5, 1996

[54] MARK SENSING ON A FORM

[75] Inventor: Dan S. Bloomberg, Palo Alto, Calif.

[73] Assignee: Xerox Corporation, Stamford, Conn.

[21] Appl. No.: 326,121

[22] Filed: Oct. 19, 1994

Related U.S. Application Data

[63] Continuation of Ser. No. 855,984, Mar. 20, 1992, Pat. No. 5,418,865.

[51] Int. Cl.$^6$ ........................................ G06K 9/44
[52] U.S. Cl. .................. 382/175; 382/257; 382/317; 358/462; 235/456
[58] Field of Search ............................... 382/175, 257, 382/282, 291, 317; 358/453, 462, 488; 235/456

[56] References Cited

U.S. PATENT DOCUMENTS

| | | | |
|---|---|---|---|
| 4,352,012 | 9/1982 | Verderber et al. | 235/487 |
| 4,893,333 | 1/1990 | Baran et al. | 379/100 |
| 4,933,979 | 6/1990 | Suzuki et al. | 382/61 |
| 5,014,331 | 5/1991 | Kurogane et al. | 382/282 |
| 5,048,109 | 9/1991 | Bloomberg et al. | 382/50 |
| 5,065,437 | 11/1991 | Bloomberg | 382/9 |
| 5,075,895 | 12/1991 | Bessho | 382/61 |
| 5,099,340 | 3/1992 | Kamada et al. | 358/403 |
| 5,129,014 | 7/1992 | Bloomberg | 382/48 |
| 5,131,049 | 7/1992 | Bloomberg et al. | 382/9 |
| 5,134,669 | 7/1992 | Keogh et al. | 382/61 |
| 5,140,139 | 8/1992 | Shepard | 235/456 |
| 5,140,650 | 8/1992 | Casey et al. | 382/61 |
| 5,181,255 | 1/1993 | Bloomberg | 382/9 |
| 5,187,753 | 2/1993 | Bloomberg et al. | 382/46 |
| 5,202,933 | 4/1993 | Bloomberg | 382/9 |
| 5,229,589 | 7/1993 | Schneider | 235/456 |

FOREIGN PATENT DOCUMENTS

| | | |
|---|---|---|
| 398185A2 | 11/1990 | European Pat. Off. . |
| 431961A2 | 6/1991 | European Pat. Off. . |
| 0431961 | 12/1991 | European Pat. Off. . |
| 62-272751 | 11/1987 | Japan . |
| 63-95578 | 4/1988 | Japan . |
| 63-242060 | 10/1988 | Japan . |
| 4-181390 | 6/1992 | Japan . |

OTHER PUBLICATIONS

Paul S. Heckbert, "A Seed Fill Algorithm," *Graphics Gems*, edited by Andrew S. Glassner, pp. 275–277 and 721–722 (Academic Press).

K. Y. Wong et al., "Document Analysis System," *IBM J. Res. Development*, vol. 26, No. 6, Nov. 1982.

Stanley R. Sternberg, "Biomedical Image Processing," *IEEE*, Jan. 1983.

Petros Maragos, "Tutorial on Advances in Morphological Image Processing and Analysis," *Optical Engineering*, vol. 26, No 7, Jul. 1987.

Robert M. Haralick et al., "Image Analysis Using Mathematical Morphology," *IEEE*, vol. PAM1-9, No. 4, Jul. 1987.

*Primary Examiner*—Leo Boudreau
*Assistant Examiner*—Chris Kelley
*Attorney, Agent, or Firm*—Townsend and Townsend and Crew LLP

[57] ABSTRACT

A robust technique for determining whether a field (43, 45, 47a–d) on a form (40'), which has been converted to a binary input image, contains a mark utilizes an approach of making an initial determination of the approximate location of the field, and then refining such determination. The form is assumed to have registration marks (fiducials) with the field at a known location relative to the fiducials. The fiducials are identified (50), and the approximate location of the field is determined (55) from the fiducial positions and the known relation between the fiducials and the field. At this point, a portion of the image (referred to as the subimage) is extracted (57). The subimage is typically somewhat larger than the field so that it can be assumed that the field is within the subimage. The field has machine-printed lines along at least part of the field perimeter. In order to distinguish these lines from hand-printed marks in the field, a copy of the subimage is subjected to a set of operations (60) on the actual pixels in the subimage that provides nominal information on the location of these lines. The boundaries of the subimage are then changed (62) to nominally exclude the lines.

26 Claims, 4 Drawing Sheets

MARK SENSING ON A FORM

This application is a continuation of application Ser. No. 07/855,984, filed Mar. 20, 1992, now U.S. Pat. No. 5,418,865.

BACKGROUND OF THE INVENTION

The present invention relates generally to computerized image processing, and more specifically to techniques for locating a particular portion of an image and extracting mark-sense information therefrom.

Forms with mark-sense fields (such as check boxes) are ubiquitous, and provide an effective way to gather and communicate information. For certain forms, such as those used for college and professional school admission tests, the instructions for making a mark in a box are very explicit, the conditions are tightly controlled, and the people making the marks are highly motivated to do so correctly. The result is that the forms can be machine-read very accurately. In other contexts, the people filling in the check boxes are likely to have neither the correct No. 2 pencil nor the patience to ensure that they mark the box in an optimal manner. Fortunately, the consequences of having the form misread by a computer tend to be lower in such contexts. Indeed, many such forms require handwritten alphanumeric information and are read by people rather than machines.

One context that presents some unique challenges to computerized image processing is a form that has been faxed once or twice. Consider a scenario where a computer generates a form and transmits it by a fax modem over the telephone line to a remote fax machine, and where a user receives the paper copy of the form from the fax machine, scribbles entries on the form (including checking certain boxes), and transmits the form to the computer from the remote fax machine. On the basis of which boxes have been checked, the computer is supposed to take appropriate action. The form is assumed to have registration marks (fiducials), with the boxes at known locations relative to the fiducials.

In general, since the form was generated by the computer and did not have to be scanned into a fax machine at the computer site, the user at the remote fax machine will receive a form of reasonably high quality. The form received by the user may, however, contain pepper noise (isolated black pixels in white regions, or vice versa) or thin horizontal lines of black pixels in white regions, or vice versa, due to noise on the telephone line. By the time the originating computer receives the filled-in form, the image is likely to have been further degraded in one or more of the above ways and one or more of the following additional ways. The image is subject to scanner noise which can manifest itself as vertical black streaks due to opaque material on the scanning platen of the fax machine. Additionally, misregistration of the check box relative to the fiducials can occur because scan lines in the fax are lost as a result of transmission noise or because the image has become distorted due to imperfections in the mechanical feed. If the feed causes the input page to be skewed, the result is trapezoidal distortion. Moreover, one or more of the registration fiducials can even be lost due to a page fold during scanning or as a result of large skew.

SUMMARY OF THE INVENTION

The present invention provides a robust technique for registering to a field on a form, which has been converted to a binary input image, possibly determining whether the field contains a mark, and, if desired, extracting the mark for further analysis or other use. The technique provides reliable sensing in the presence of various image and scanner noise and misregistration in the input image.

In brief, the present invention utilizes an approach of making an initial determination of the approximate location of the field, and then refining such determination. The form is assumed to have registration marks (fiducials) with the field at a known location relative to the fiducials. The fiducials are identified, and the approximate location of the field is determined from the fiducial positions and the known relation between the fiducials and the field. At this point, a portion of the image (referred to as the subimage) is extracted. The subimage is typically somewhat larger than the field so that it can be assumed that the field is within the subimage.

In one set of embodiments it is assumed that the field has associated with it one or more machine-printed lines along at least part of the field perimeter (typically a rectangle surrounding the field or a right-angle bracket along two sides). It is necessary to distinguish these border lines from hand-printed marks in the field. To this end, a copy of the subimage is subjected to a set of operations on the actual pixels in the subimage that provides nominal information on the location of these lines. The boundaries of the subimage are then changed to nominally exclude the lines. This is preferably done in one of two ways.

A first way is to determine the location of the bounding box (smallest enclosing rectangle) of the largest connected component in the subimage. The subimage boundaries are modified (truncated, translated, or both) to bring the subimage boundaries inward of the bounding box by an amount that exceeds the border line thickness, thereby excluding what are believed to be the lines. If the connected component analysis fails (e.g., because the border lines are broken), the subimage boundaries are modified to bring them inward of the smallest rectangle that encloses all the ON pixels. A second way is to actually locate at least some of the lines by morphological operations that, in effect, project out the lines. The subimage boundaries are then modified to exclude these lines.

The modified subimage is then extracted and ON pixels counted. If the number exceeds a threshold, the field is considered to contain a mark. Morphological operations may be performed on the modified subimage to remove pepper noise and single-pixel height lines before counting ON pixels. The modified subimage may be stored if further analysis or other use of the mark is desired.

A further understanding of the nature and advantages of the present invention may be realized by reference to the remaining portions of the specification and the drawings.

DESCRIPTION OF SPECIFIC EMBODIMENTS

DEFINITIONS AND TERMINOLOGY

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including nonalphabetic linguistic characters.

"Line graphics" refers to portions of a document or image composed of graphs, figures, or drawings other than text, generally composed of horizontal, vertical, and skewed lines having substantial run length as compared to text. Graphics could range from, for example, horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold level T. Reduction with SCALE=N entails dividing the source image into N×N squares of pixels, mapping each such square in the source image to a single pixel on the destination image. The value for the pixel in the destination image is determined by the threshold level T, which is a number between 1 and $N^2$. If the number of ON pixels in the pixel square is greater or equal to T, the destination pixel is ON, otherwise it is OFF.

"Subsampling" is an operation wherein the source image is subdivided into smaller (typically square) elements, and each element in the source image is mapped to a single pixel in the destination image. The destination pixel value is defined by a selected pixel in the source image element. The selection may be predetermined (e.g., upper left pixel) or random.

A "4-connected region" (or "4-connected component") is a set of ON pixels wherein any two pixels in the set can be joined by a path that includes the two pixels and includes only pixels in the set, and each pixel on the path is laterally or vertically adjacent to at least one other pixel on the path. An isolated ON pixel that has no 4-connected neighbors may as a matter of definition be considered a 4-connected region.

An "8-connected region" ("or 8-connected component") is a set of ON pixels wherein any two pixels in the set can be joined by a path that includes the two pixels and includes only pixels in the set, and each pixel on the path is laterally, vertically, or diagonally adjacent to at least one other pixel on the path. An ON pixel that has no 8-connected neighbors may as a matter of definition be considered an 8-connected region.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent to each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Generalized opening" is a morphological operation that consists of an erosion (using the hits and misses in the SE) followed by a dilation (using only the hits in the SE).

"Closing" is a morphological operation consisting of a dilation followed by an erosion.

For opening, generalized opening, and closing, the result does not depend on the center location of the SE since each operation includes successive complementary operations with the same SE.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

SYSTEM OVERVIEW

Figure 1:
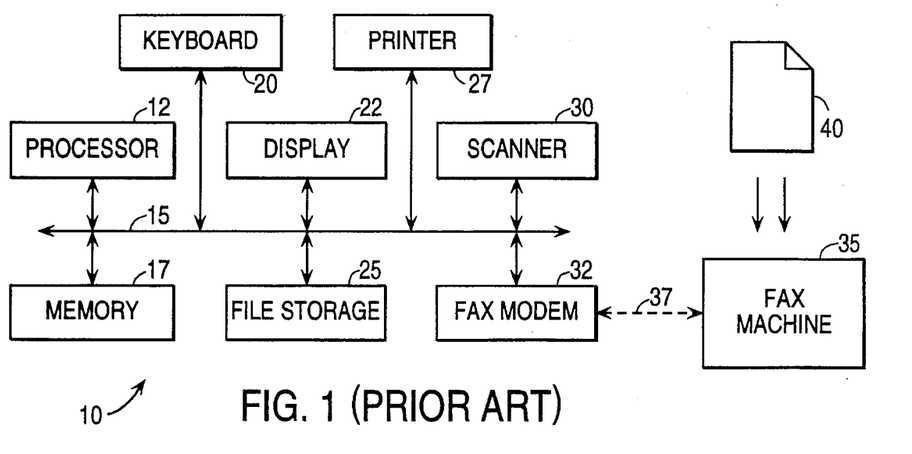
FIG. 1 is a block diagram of a computer system within which the present invention may be embodied.

FIG. 1 is a block diagram of a computer system 10 within which the present invention may be embodied. The computer system configuration illustrated at this high level is standard, and as such, FIG. 1 is labeled prior art. A computer system such as system 10, suitably programmed to embody the present invention, however, is not. In accordance with known practice, the computer system includes a processor 12 that communicates with a number of peripheral devices via a bus subsystem 15. These peripheral devices typically include a memory 17, a keyboard or other input device 20, a display 22, a file storage system 25 such as one or more hard disk drives and floppy disk drives, a printer 27, an optional scanner 30, and a fax modem 32. Fax modem 32 is shown as being in intermittent communication with a fax machine 35, normally considered to be at a remote location, via a telephone line 37 (shown in phantom). It will be appreciated that computer system 10 includes all the elements of a fax machine, and references to a fax machine are generally meant to include such a computer system as well as a self-contained fax machine.

The present invention relates to image analysis, and according to the invention, processor 12, suitably programmed, operates to extract certain characteristic portions of a binary input image. In a typical case, the input image originates from a paper document 40 that was scanned into scanner 30 or that was scanned into fax machine 35 and communicated to fax modem 32 over phone line 37. In a case where fax machine 35 is a computer with a fax modem, the input image could also have been generated on that computer and faxed to fax modem 32.

The encoding of an input bitmap, the transmission of the encoded file to another fax machine, and the decoding into an output bitmap occur according to a standard facsimile protocol, such as the CCITT group 3 or group 4 encoding formats. From the point of view of the present invention, what is referred to above as the output bitmap is considered the binary input image. It is contemplated that document 40 may well have been received at fax machine 35 as a blank form to be filled in by a user.

INVENTION OVERVIEW

Figure 2:
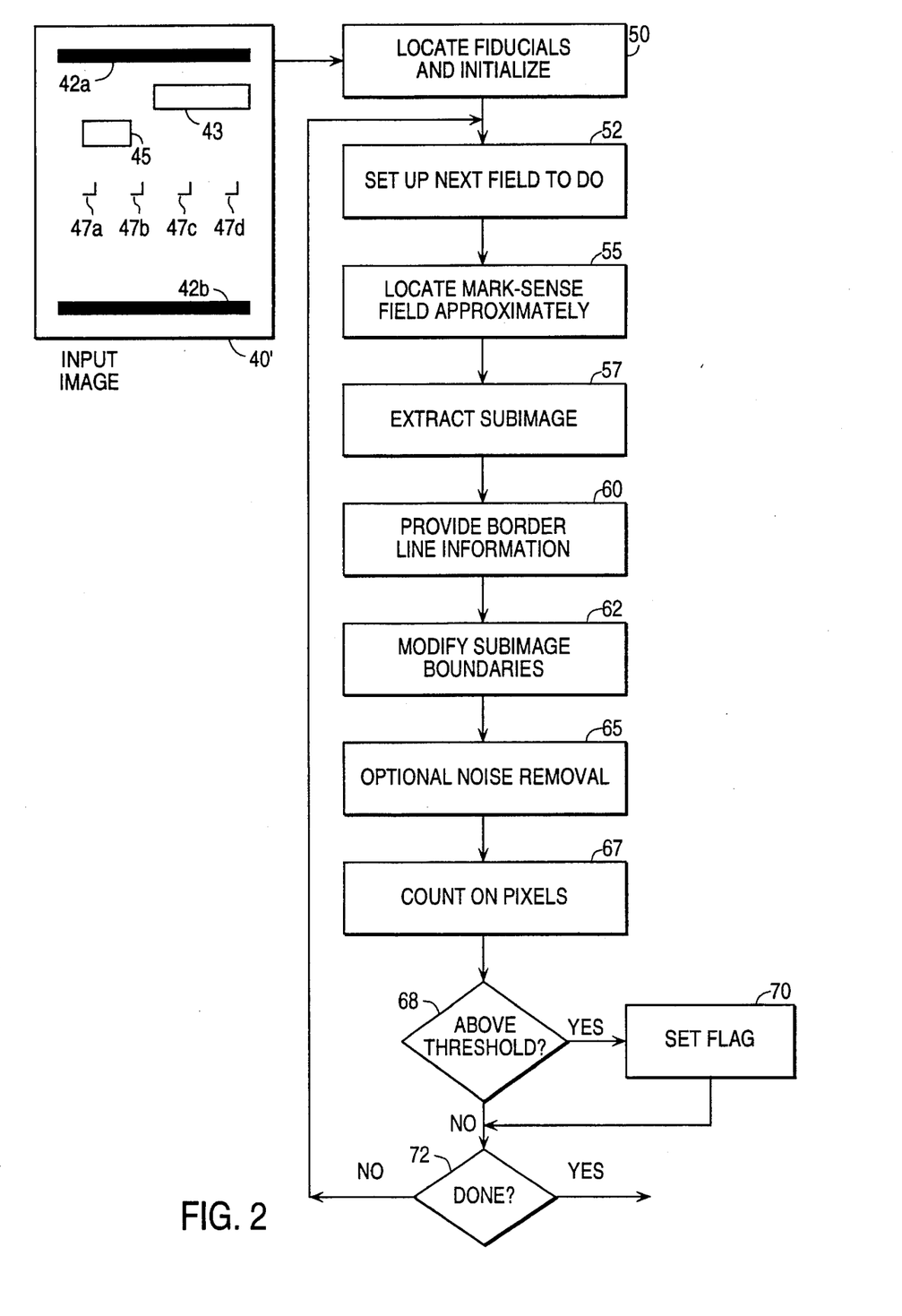
FIG. 2 is a flow diagram showing the method of determining whether a mark-sense field on a form contains handwritten marks.

FIG. 2 is a flow diagram showing a representative sequence of operations for carrying out the present invention. A particular input image, designated 40', represents a simplified view of a form that might be processed by the invention. As can be seen, the form includes fiducials 42a and 42b, which take the form of rectangular solid bands near the top and the bottom, various other fields, designated 43 and 45, that either contain information or accept handwritten information, and a number of mark-sense fields 47a–47d. The mark-sense fields allow the user to input information by placing marks in some fields and not others.

The invention provides a technique for registering to one of the fields, either to determine if there are marks in it or to extract the content of the field for further use, or both. The description that follows is primarily directed to determining whether a given mark-sense field contains a mark, but the techniques also apply to extracting other information from the other types of field.

In the specific embodiment, the mark-sense fields are bordered on two sides by right-angle brackets having a lower right corner. Alternatives would be to have the fields bordered by other combinations of one or more lines. A single horizontal line along the bottom or top of the field, spaced horizontal lines along the top and the bottom, a single vertical line along the right or left side of the field, spaced vertical lines along both sides, and lines along three sides are possible. The lines along the border of the field will sometimes be referred to as the border lines or the border.

The remaining portions of the flow diagram show the major steps for determining whether there are handwritten marks in mark-sense fields 47a–d. The image is first processed to locate the fiducials. As will be described below, the corners of the fiducial bands are located (step 50) and initial setup is performed. The initialization will typically include determining from other fields on the form the type of form and thus the number of mark-sense fields and their locations. From the point of view of the invention, it can be assumed that this information is known, being stored as a template. The remaining steps are performed for each mark-sense field to be evaluated, and a representative looping operation is shown.

The next field is selected (step 52), and the location of the field is approximately determined (step 55) in view of the measured fiducial positions and template information on the expected positions of the mark-sense field relative to the fiducials. A subimage corresponding to the field is extracted (step 57). This subimage is sufficiently larger than the actual field (say by 20% in linear dimension) to account for the fact that despite the calculation, there may be residual errors due to pixel noise, non-linear distortion, and the like.

The location of the field is refined (step 60) as the subimage is subjected to morphological and other operations that attempt to gain information regarding the location of the border lines. Based on this information, the subimage boundaries are modified (step 62) in order that the modified subimage nominally exclude the border lines.

The modified subimage is optionally subjected to noise removal operations (step 65), the number of ON pixels in the modified subimage (as optionally processed) is counted (step 67), and the number is compared to a threshold (step 69). If the number is above the threshold, an indication is made (step 70) that the field contains a mark; if the number is not above the threshold, no such indication is made. A determination is then made whether all the fields have been processed (step 72), and if not, subsequent fields are processed.

FIDUCIAL AND MARK-SENSE FIELD LOCATION

Figure 3:
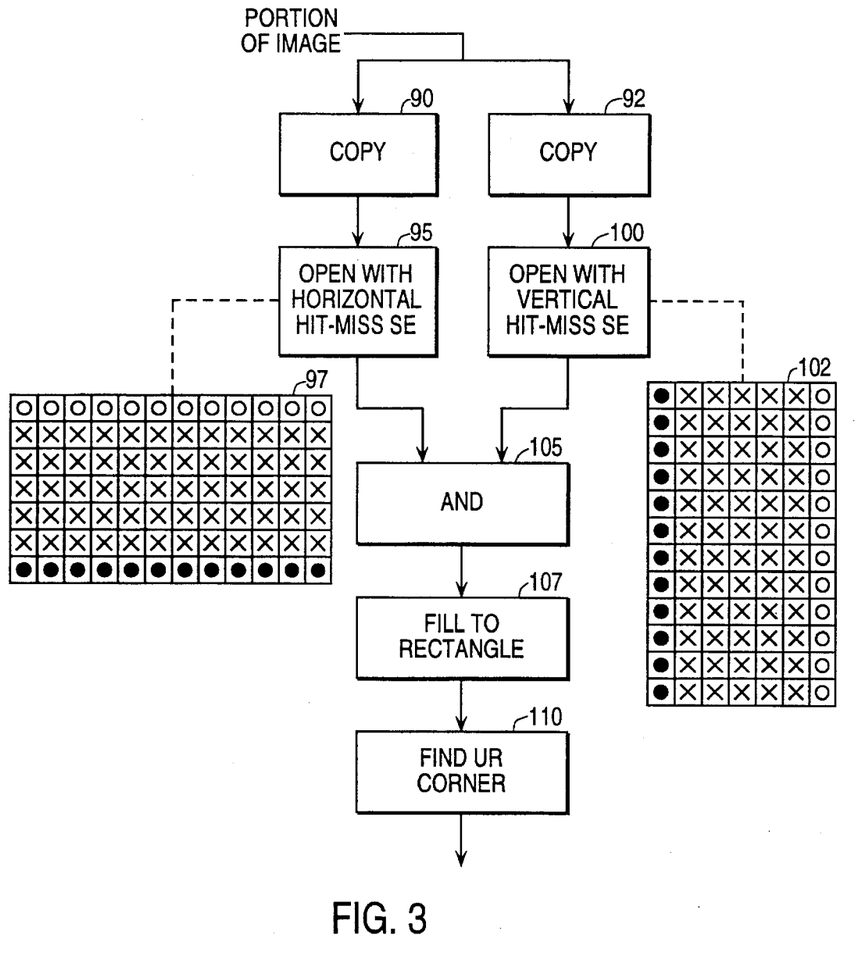
FIG. 3 is a flow diagram showing a technique for locating fiducial marks in the input image.

FIG. 3 is an expanded flow diagram showing a sequence of operations for locating the upper right corner of fiducial 42a. Similar sequences are used for locating the upper left corner of fiducial 42a and the lower left and lower right corners of fiducial 42b. A portion of the image, expected to contain the upper right region of fiducial 42a, is copied (steps 90 and 92). The first copy is subjected to a generalized opening operation (step 95) with a horizontal hit-miss SE 97. Horizontal hit-miss SE 97 operates, in effect, to project out the top edge of the fiducial band. While the SE is shown as only 12 pixels wide, it is preferably on the order of 30–50 pixels wide. The SE contains a top row of misses (OFF pixels), a bottom row of hits (ON pixels), and a number of rows of "don't care" pixels in between. The number of intermediate rows depends on the skew that the system is to account for. An SE that is 50 pixels wide and contains five intermediate rows of "don't care" pixels corresponds to the ability to detect the edge in the presence of approximately 5° of skew. The second copy is subjected to a generalized opening operation (step 100) with a vertical hit-miss SE 102. Vertical SE 102 contains a column of ON pixels along the left edge, a column of OFF pixels along the right edge, and a number of intermediate columns of "don't care" pixels. The general dimensions and considerations are as discussed above for SE 97.

The resulting images from the generalized open operations are ANDed (step 105), resulting in a small approximately rectangular region of ON pixels (say 3–4 pixels on a side). This region may be filled to the smallest enclosing rectangle (step 107), and the upper right corner of the region (whether or not filled) is located (step 110). The upper right corner of the ON pixel region is preferably located by a technique that, in effect, scans inwardly at 45° starting at the upper right corner of the portion of the image. The actual implementation scans horizontally in from the right, locates the rightmost pixel in each scan line, and selects the pixel that is closest to the corner. Alternatively, if the region is filled to a rectangle, the corner may be located by selecting the upper right corner pixel (e.g., by a pattern match). The particular details of filling to a rectangle may be found in allowed patent application Ser. No. 449,203, filed Dec. 8, 1989, titled "IMAGE REGISTRATION," the disclosure of which is incorporated by reference. The other fiducial positions are located in the same way with appropriately oriented hit-miss SE's.

The locations of the fiducials and the mark-sense fields are known a priori in what can be referred to as template coordinates. The above procedure provides the locations of the fiducials in what can be referred to as scan coordinates (pixel position coordinates). Since all the image processing is in terms of scan coordinates, locating the mark-sense fields requires derivation of a transformation from template coordinates to scan coordinates. This can be done using an affine or a bilinear transformation.

An affine transformation is linear and homogeneous, and takes into account translation, rotation, linear scaling, and shear. The transformation of a point with template coordinates (x,y) to scan coordinates (x',y) is of the form:

$$x'=ax+by+c$$

$$y'=dx+ey+f$$

Three known fiducial locations (template coordinates) and three measured fiducial locations (scan coordinates) provide six linear equations in the six unknown parameters (a, b, c, d, e, f), which can be solved for the parameters.

A bilinear transformation is non-linear and takes the form:

$$x'=ax+bxy+cy+d$$

$$y'=ex+fxy+gy+h$$

Four known and four measured fiducial locations lead to eight linear equations in the eight unknown parameters, which can be solved for the parameters.

Once the coefficients are determined, they are used to transform the template coordinates of the mark-sense fields into scan coordinates. These scan coordinates represent expected locations, given the various sources of noise, distortion, and the like that have caused the input image to depart from the ideal represented by the template.

In a specific embodiment, the affine transformation is used if only three corners are found and they are determined to be valid. Since losing a corner is a cause for concern, the three points are required to closely approximate the vertices of a right triangle (say 90°±1°). The bilinear transformation is used if four corners are found and they are determined to be valid. Four corners are considered valid if they closely approximate the vertices of a parallelogram. This will be satisfied if for each pair of opposite sides of the quadrilateral, the two sides in that pair are approximately equal (difference less than an empirical threshold, say about 2%).

DETERMINATION OF BORDER LINE INFORMATION

Once a nominal location of the mark-sense field is determined, and a somewhat enlarged subimage expected to contain the field is extracted, the subimage is processed by one of a number of techniques to provide border line information for the field.

Figure 4:
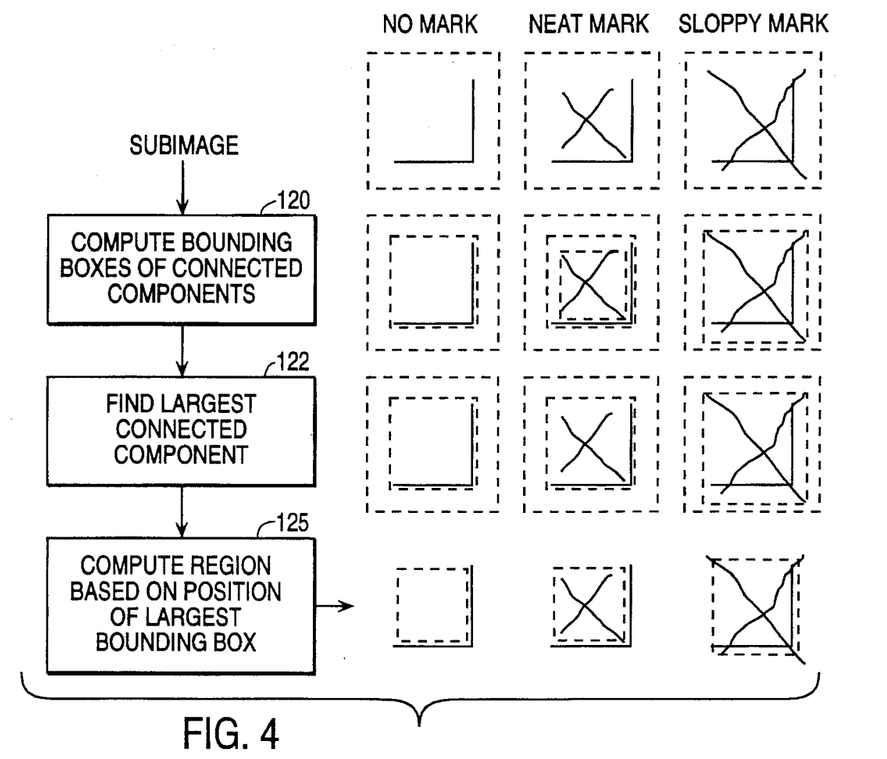
FIG. 4 is a flow diagram showing one embodiment of the present invention.

FIG. 4 is a flow diagram showing one technique for providing border line information and modifying the subimage boundaries. The figure also shows the result of each step for three possibilities, namely no mark in the mark-sense field, a neatly drawn mark that is entirely included within the border lines, and a sloppily drawn mark that goes outside the border lines. The input subimage (large dashed rectangle) is subjected to a set of operations that computes the bounding boxes of all 4-connected components (step 120). The analysis could just as well be performed on 8-connected components. These bounding boxes are shown as dashed lines surrounding the objects. In the case of the border lines as a separate connected component, the bounding box is shown spaced slightly outside the border lines for clarity. In the case of the neatly drawn mark, separate bounding boxes for the border lines and the handwritten mark are shown. For the sloppily drawn mark, the mark and border lines define a single connected object, and the single bounding box is shown.

The bounding box with the largest perimeter is then selected (step 122) as indicating the largest connected component. In the first two cases, the largest connected component is the printed border (right-angle bracket), while in the case of the sloppily drawn mark, it is partially or totally defined by the mark itself. The modification of the subimage boundaries is based on the location of the bounding box with the largest perimeter. In the case of a right angle bracket, the bounding box could be translated upwardly to the left by a distance based on the line thickness of the bracket in order to exclude the bracket. It is preferred however, to translate and shrink the subimage. It is noted that this technique would also work if the border is a rectangle surrounding the mark-sense field.

It should be noted that in the first case, the modified subimage excludes the border and thus contains no ON pixels. In the second case, the modified subimage excludes the border but includes the mark, and therefore contains ON pixels that provide an indication of the presence of a mark in the field. The third case is interesting because the modified subimage does not exclude the border. However, the reason for that is because there was a large mark drawn that crossed through the border lines. Accordingly, the modified subimage includes the border and a major portion of the mark, and actually provides a stronger indication that there is a mark in the field. Thus, this technique, nominally excluding the border, provides the right answer, even when it doesn't exclude the border.

This technique has a potential weakness in a situation where a mark intended to be made in one field touches the border of an empty second field. This can cause the modified subimage for the second field to be misregistered (off the second border), so that after translation, the region still includes enough of the machine-printed border to exceed the threshold. For this reason, it is useful to separate the mark-sense fields and make them small enough so that users are not likely to draw a line connecting two borders. A similar problem can arise from noise projecting out from an empty box.

A further potential problem arises if the border lines are thin in the original and comprise more than one connected component in the scanned image. This is more likely to happen where the field is relatively large, as is the case where the user writes actual information that is to be saved as a bitmap. This will in general be detectable, since the bounding box with the largest perimeter will be significantly smaller than the known size of the printed border. If this is detected, the subimage boundaries are modified by moving them inside the smallest rectangle that includes all the ON pixels by a distance based on the thickness of the border lines.

Figure 5:
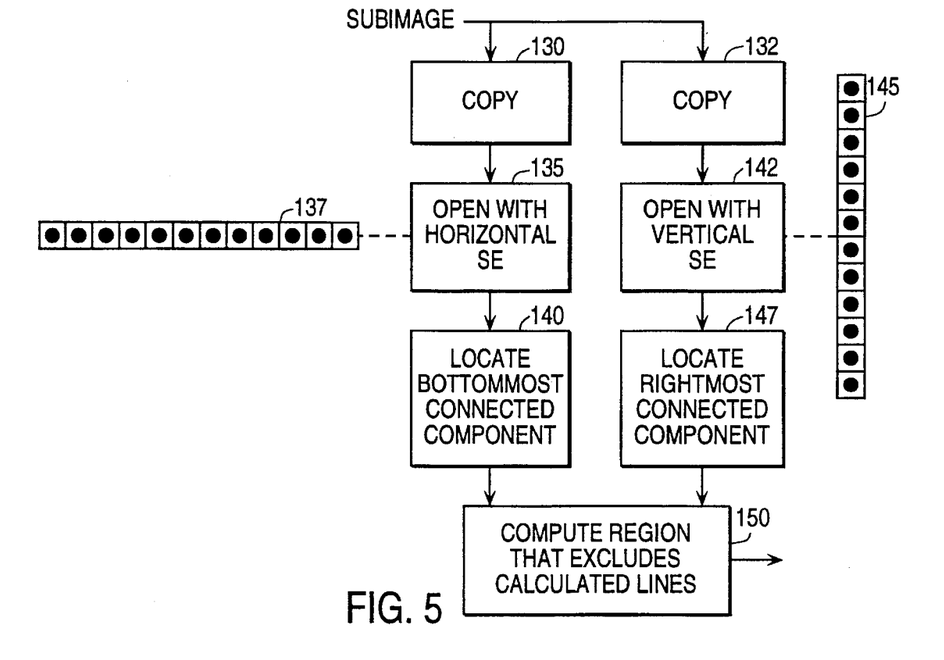
FIG. 5 is a flow diagram showing a second embodiment of the present invention.

FIG. 5 is a flow diagram showing a second technique for providing the border line information and modifying the subimage boundaries. Copies of the subimage are made (steps 130 and 132). The first copy is opened (135) with a horizontal SE 137, and the vertical location of the bottommost connected component is determined (step 140). The second copy is opened (step 142) with a vertical SE 145, and the horizontal location of the rightmost connected component is determined (step 147). Horizontal and vertical SE's 137 and 145 are on the order of 20–60% (typically 30–40%) of the respective horizontal and vertical dimensions of the expected bracket or rectangle. Accordingly, the result of the opening steps should be to project out the bottom and right border lines. These vertical and horizontal locations allow a determination of the location of the border lines, and a region is then computed that excludes these calculated line locations (step 150). Since this technique locates the lines, it does not suffer the potential weakness discussed above.

This technique works for a bracket or a rectangle. However, in the case of a rectangle, the opening operations project both of the opposite sides, and therefore step 140 can be accompanied by finding the vertical location of the topmost connected component to provide extra information. Similarly, step 147 can be accompanied by finding the horizontal location of the leftmost connected component.

CONNECTED COMPONENT ANALYSIS

Figure 6:
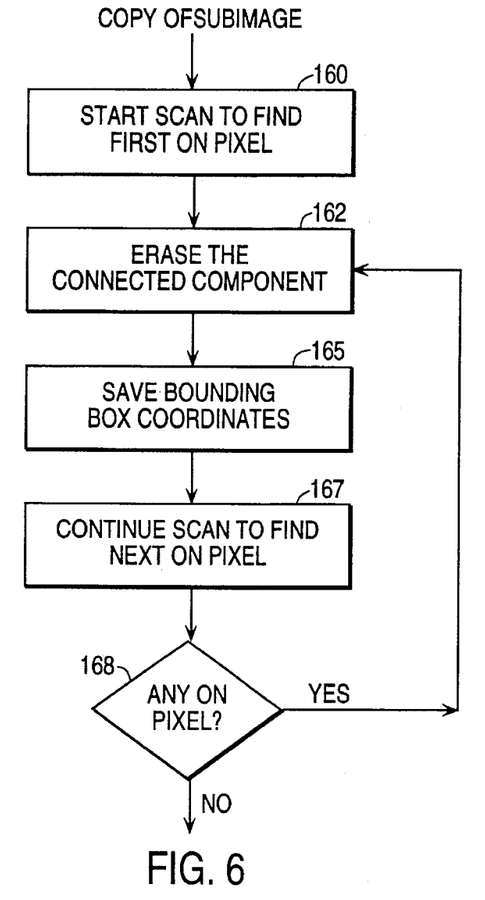
FIG. 6 is a flow diagram showing a technique for determining bounding box locations.

FIG. 6 is a flow diagram showing a technique for extracting coordinate information on connected components in the subimage. A copy of the subimage is scanned by the computer (i.e., each pixel is evaluated), starting at the upper left and proceeding from left to right and top to bottom until an ON pixel is found (step 160). The coordinates of that pixel are saved, and initially represent the current best information regarding the corners of the bounding box of the connected component to which the found pixel belongs (the bounding box is fully specified by its upper left and lower right corners). The found pixel and all its 4-connected neighbors are turned OFF (step 162). As each pixel is turned OFF, its coordinates are compared with the current corner coordinates. If either coordinate is outside the range of the current bounding box, the appropriate corner coordinate(s) are updated to enlarge the now-current bounding box. The technique for finding and turning off the 4-connected neighbors is described in Paul S. Heckbert, "A Seed Fill Algorithm," pages 275–277 and 721–722 of "Graphics Gems," edited by Andrew S. Glassner (Academic Press, Inc. 1990).

Once a connected component has been erased and its bounding box coordinates saved (step 165), the scan begins again (step 167), starting immediately past the position where the first pixel in the just-erased component was found. If another ON pixel is found (test 168), the sequence starting at step 162 is repeated. Once the resumed scan fails to find an ON pixel, the procedure is complete, and the relevant bounding box information can be extracted. In the case of the embodiment illustrated in FIG. 4, the bounding box with the largest perimeter is selected. In the case of the embodiment illustrated in FIG. 5, the bounding box(es) having the rightmost horizontal coordinate and the bottommost vertical coordinate provide the border line information sought.

OPTIONAL NOISE REMOVAL

Figure 7:
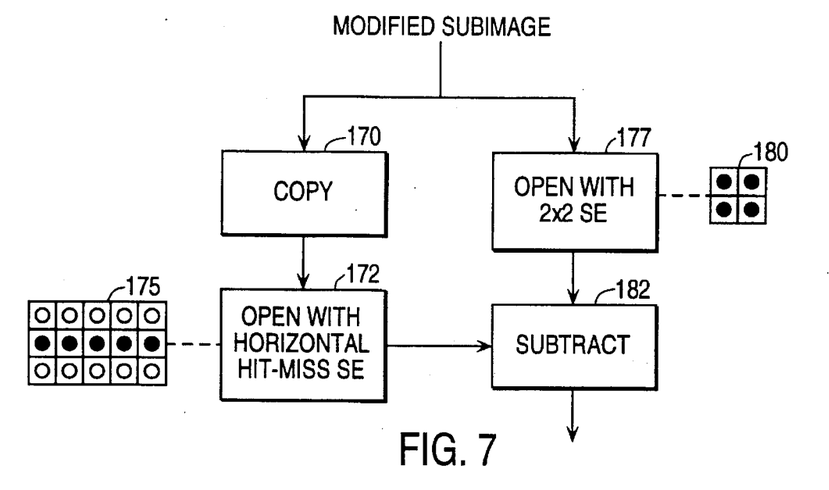
FIG. 7 is a flow diagram showing optional noise removal operations prior to counting ON pixels.

FIG. 7 is a flow diagram illustrating two optional techniques for removing certain types of noise from the modified subimage prior to counting ON pixels. These techniques are tailored to the type of noise often found in fax transmissions, namely thin horizontal lines, one pixel thick due to transmission noise, and pepper noise (isolated ON pixels distributed over the image). Pepper noise is also often found in scanned images. The figure shows a regime for performing both types of noise reduction, it being understood that both are optional. The modified subimage is copied (step 170), and the copy is opened (step 172) with a horizontal hit-miss SE 175. This has the effect of projecting out the thin horizontal lines. The modified subimage is optionally opened (step 177) with a 2×2 solid SE 180. The result of step 172 is subtracted (step 182) to remove the horizontal lines.

ALTERNATIVE APPROACHES

Other possible approaches are described below, but for the reasons also set forth, are believed to be less robust in the presence of the anticipated type of noise and distortion.

One approach is to attempt to remove the printed lines bordering the mark-sense field. Each subimage could be opened for horizontal and vertical lines, and the result subtracted from the original. However, the horizontal and vertical border lines are likely to have edge noise which would also have to be removed. Further, if the box were filled in, the hand marks would be removed, and if the hand marks were nearly horizontal or vertical lines, they would disappear. These problems are partly overcome by using a generalized opening for an edge of a horizontal and vertical line, but this will be largely ineffective if the printed lines are too thick, and also suffers from the problem that handwritten marks that are nearly horizontal or vertical would disappear.

Yet another approach is to count all the ON pixels from each subimage, make a histogram, and look for a break between the marked and unmarked fields. Heuristics can be used to estimate in advance how many pixels are expected to be ON from the printed lines alone. However, if the border lines are heavy, discrimination will be poor because the number of ON pixels added by the hand marks will be relatively small. Moreover, variations in the width of the printed lines may mask the hand marks, especially if the latter are written lightly (e.g., in pencil). Moreover, if most or all of the fields are marked, the histogram would probably not show a clear break between marked and unmarked boxes.

DISCUSSION OF THE SOFTWARE

A current embodiment of the invention is implemented in software on a personal computer. Source code in the C language for performing the various types of morphological operations on a Sun Workstation is disclosed in U.S. Pat. No. 5,065,437, titled "IDENTIFICATION AND SEGMENTATION OF FINELY TEXTURED AND SOLID REGIONS OF BINARY IMAGES," the disclosure of which is incorporated by reference.

CONCLUSION

In summary it can be seen that the present invention provides a robust technique for determining whether there are hand marks in a mark-sense field on a form. The technique takes into account the various types of misregistration, distortion, and image noise that are likely to be present.

While the above is a complete description of the preferred embodiments of the invention, various alternatives and equivalents may be used. Therefore, the above description and illustrations should not be taken as limiting the scope of the invention which is defined by the claims.

What is claimed is:

1. A method, performed by a processor-based machine on a bitmap input image, for registering to a field in the input image, the field having an associated border line of a particular thickness along a particular edge, the field assumed to be at a known location relative to a set of registration fiducials in the input image, the method comprising operating the processor-based machine to perform the steps of:

locating the set of fiducials;

determining the approximate location of the field on the basis of the locations of the fiducials;

extracting a portion of the input image that is expected to include the field, the portion being referred to as the subimage;

the subimage having a boundary, referred to as the particular subimage boundary, that corresponds in orientation and relative position to the particular edge;

determining the location of the smallest enclosing rectangle of the largest connected component in the subimage;

the smallest enclosing rectangle having a side, referred to as the particular rectangle side, that corresponds in orientation and relative position to the particular edge; and moving the particular subimage boundary so that it is spaced inwardly from the particular rectangle side by a distance that exceeds the particular line thickness by a particular amount, thereby providing a modified subimage that (a) excludes the border line for cases when there is no mark in the field and for cases when there is a mark entirely in the field, and (b) does not exclude the border line for cases when a mark touches the border line and connected ON pixels from the mark extend outwardly from the border line by a perpendicular distance that exceeds the particular amount.

2. The method of claim 1 wherein the particular edge of the field is a horizontal edge.

3. The method of claim 1 wherein:

the field has three additional border lines of the particular thickness along three additional edges so as to define a rectangle of ON pixels surrounding the field; and the method further comprises the steps of moving additional boundaries of the subimage that correspond in orientation and relative position to the additional edges so that the additional boundaries of the subimage are spaced inwardly from the sides of the smallest enclosing rectangle by a distance that exceeds the particular line thickness.

4. The method of claim 1 wherein:

the particular edge is a particular horizontal edge;

the field has an additional border line of the particular thickness along a particular vertical edge so as to define a right-angle bracket of ON pixels, defined by vertical and horizontal lines along particular vertical and horizontal edges of the field;

the subimage has particular vertical and horizontal boundaries that correspond in relative position to the particular vertical and horizontal edges;

the smallest enclosing rectangle has particular vertical and horizontal sides that correspond in relative position to the particular vertical and horizontal edges; and the method further comprises the step of moving the particular vertical boundary of the subimage so that the particular vertical boundary of the subimage is spaced inwardly from the particular vertical side of the smallest enclosing rectangle by a distance that exceeds the particular line thickness.

5. The method of claim 1, and further comprising the step, performed after said moving step, of determining whether the ON pixels in the modified subimage meet a criterion that specifies whether the field contains a mark.

6. The method of claim 5 wherein the criterion is whether the number of ON pixels in the modified subimage exceeds a particular number.

7. The method of claim 5, and further comprising the step, performed before said step of determining whether the ON pixels in the modified subimage meet a criterion, of opening the modified subimage with a solid structuring element to remove pepper noise.

8. The method of claim 5, and further comprising the steps, performed after said moving step and before said step of determining whether the ON pixels in the modified subimage meet a criterion, of:

opening a copy of the modified subimage with a horizontal hit-miss structuring element to remove all ON pixels other than thin horizontal lines and storing the result as a temporary subimage; and subtracting the temporary subimage from the modified subimage in order to remove thin horizontal lines therefrom.

9. A method, performed by a processor-based machine on a bitmap input image, for determining whether a field in the input image contains a mark, the field having an associated border line of a particular thickness along a particular edge, the field assumed to be at a known location relative to a set of registration fiducials in the input image, the method comprising operating the processor-based machine to perform the steps of:

locating the set of fiducials;

determining the approximate location of the field on the basis of the locations of the fiducials;

extracting a portion of the input image, the portion being referred to as a subimage, that is expected to include the field;

the subimage having a boundary, referred to as the particular subimage boundary, that corresponds in orientation and relative position to the particular edge;

determining the location of the smallest enclosing rectangle of the largest connected component in the subimage;

the smallest enclosing rectangle having a side, referred to as the particular rectangle side, that corresponds in orientation and relative position to the particular edge;

moving the particular subimage boundary so that it is spaced inwardly from the particular rectangle side by a distance that exceeds the particular line thickness by a particular amount, thereby providing a modified subimage that (a) excludes the border line for cases when there is no mark in the field and for cases when there is a mark entirely in the field, and (b) does not exclude the border line for cases when a mark touches the border line and connected ON pixels from the mark extend outwardly from the border line by a perpendicular distance that exceeds the particular amount; and determining whether the ON pixels in the modified subimage meet a criterion that specifies whether the field contains a mark.

10. The method of claim 9 wherein the border line is a horizontal line.

11. The method of claim 9 wherein the border line is a vertical line.

12. The method of claim 9 wherein:

the field has three additional border lines of the particular thickness along three additional edges so as to define a rectangle of ON pixels surrounding the field; and the method further comprises moving additional boundaries of the subimage that correspond in orientation and relative position to the additional edges so that the additional boundaries of the subimage are spaced inwardly from the sides of the smallest enclosing rectangle by a distance that exceeds the particular line thickness.

13. The method of claim 9 wherein:

the particular edge is a particular horizontal edge;

the field has an additional border line of the particular thickness along a particular vertical edge so as to define a right-angle bracket of ON pixels, defined by vertical and horizontal lines along particular vertical and horizontal edges of the field;

the subimage has particular vertical and horizontal boundaries that correspond in relative position to the particular vertical and horizontal edges;

the smallest enclosing rectangle has particular vertical and horizontal sides that correspond in relative position to the particular vertical and horizontal edges; and the method further comprises the step of moving the particular vertical boundary of the subimage so that the particular vertical boundary of the subimage is spaced inwardly from the particular vertical side of the smallest enclosing rectangle by a distance that exceeds the particular line thickness.

14. The method of claim 9, and further comprising the step, performed before said step of determining whether the ON pixels in the modified subimage meet a criterion, of opening the modified subimage with a solid structuring element to remove pepper noise.

15. The method of claim 9, and further comprising the steps, performed before said step of determining whether the ON pixels in the modified subimage meet a criterion, of:

opening a copy of the modified subimage with a horizontal hit-miss structuring element to remove all ON pixels other than thin horizontal lines and storing the result as a temporary subimage; and subtracting the temporary subimage from the modified subimage in order to remove thin horizontal lines therefrom.

16. The method of claim 9 wherein the particular edge of the field is a horizontal edge.

17. The method of claim 9 wherein the criterion is whether the number of ON pixels in the modified subimage exceeds a particular number.

18. A method, performed by a processor-based machine on a bitmap input image, for determining whether a field contains a mark, the field having a border line of a particular thickness along at least one edge, the field assumed to be at a known location relative to a set of registration fiducials in the input image, comprising operating the processor-based machine to perform the steps of:

locating the set of fiducials;

determining the approximate location of the field on the basis of the locations of the fiducials;

extracting a portion of the input image, the portion being referred to as a subimage, that is expected to include the field;

the subimage having boundaries that correspond in orientation and relative position to respective edges of the field;

determining the location of the smallest enclosing rectangle of the largest connected component within the subimage;

the smallest enclosing rectangle having sides that correspond in orientation and relative position to respective edges of the field;

each edge of the field thus having associated therewith a corresponding boundary of the subimage and a corresponding side of the rectangle;

for each edge of the field that has a border line therealong, moving that edge's corresponding subimage boundary so that it is spaced inwardly from that edge's corresponding rectangle side by a distance that exceeds the particular line thickness by a particular amount so as to provide a modified subimage that (a) excludes the border line for cases when there is no mark in the field and for cases when there is a mark entirely in the field, and (b) does not exclude the border line for cases when a mark touches the border line and connected ON pixels from the mark extend outwardly from the border line by a perpendicular distance that exceeds the particular amount; and determining whether the ON pixels in the modified subimage meet a criterion that specifies whether the field contains a mark.

19. The method of claim 18 wherein the criterion is whether the number of ON pixels in the modified subimage exceeds a particular number.

20. The method of claim 18 wherein the field has an edge that has no border line therealong, and further comprising the step, performed before said determining step, of moving the boundary corresponding to the edge that has no border line therealong.

21. A method, performed by a processor-based machine on a bitmap input image, for registering to a field in the input image, the field having a perimeter with a border comprising connected ON pixels along at least a portion of the perimeter, the field assumed to be at a known location relative to a set of registration fiducials in an input image, the method comprising the operating the processor-based machine to perform steps of:

locating the set of fiducials;

determining the approximate location of the field on the basis of the locations of the fiducials;

extracting a portion of the input image that is expected to include the field, the portion being referred to as the subimage and being characterized by a boundary;

determining the location of the smallest enclosing rectangle of the largest connected component within the subimage, the smallest enclosing rectangle thus providing nominal information regarding the location of the border in the subimage; and modifying the boundary of the subimage by moving at least a portion of the boundary inwardly so as to (a) exclude the border line based on the nominal information for cases when there is no mark in the field and for cases when there is a mark entirely in the field, and (b) not exclude the border line for at least some cases when a mark touches the border line and connected ON pixels from the mark extend outwardly from the border line by a perpendicular distance that exceeds a particular amount.

22. The method of claim 21 wherein:

the border includes a straight line segment of ON pixels characterized by a particular line thickness along a particular edge of the field;

the subimage has a boundary, referred to as the particular subimage boundary, that corresponds in orientation and relative position to the particular edge;

the smallest enclosing rectangle has a side, referred to as the particular rectangle side, that corresponds in orientation and relative position to the particular edge; and said modifying step includes moving the particular subimage boundary so that it is spaced inwardly from the particular rectangle side by a distance that exceeds the particular line thickness.

23. The method of claim 22 wherein the particular edge of the field is a horizontal edge.

24. The method of claim 21 wherein:

the border is a rectangle of ON pixels characterized by a particular line thickness; and said modifying step includes moving the boundaries of the subimage so that they are spaced inwardly from the sides of the smallest enclosing rectangle by a distance that exceeds the particular line thickness.

25. The method of claim 21 wherein:

the border includes a right-angle bracket of ON pixels, defined by vertical and horizontal lines along particular vertical and horizontal edges of the field and characterized by a particular line thickness;

the subimage has particular vertical and horizontal boundaries that correspond in relative position to said particular vertical and horizontal edges;

the smallest enclosing rectangle has particular vertical and horizontal sides that correspond in relative position to the particular vertical and horizontal edges; and said modifying step includes moving the particular vertical and horizontal boundaries of the subimage so that they are spaced inwardly from the particular vertical and horizontal sides of the smallest enclosing rectangle by a distance that exceeds the particular line thickness.

26. The method of claim 21 wherein said border consists only of straight lines.

* * * * *